United States Patent

Krimmer et al.

[11] Patent Number: 5,878,991
[45] Date of Patent: Mar. 9, 1999

[54] MAGNET VALVE FOR FUEL TANK VENTILATION

[75] Inventors: Erwin Krimmer, Pluderhausen; Wolfgang Schulz, Bietigheim-Bissingen; Tilman Miehle, Kernen, all of Germany

[73] Assignee: Robert Bosch GmbH, Stuttgart, Germany

[21] Appl. No.: 952,935
[22] PCT Filed: Nov. 13, 1996
[86] PCT No.: PCT/DE96/02159
    § 371 Date: Nov. 12, 1997
    § 102(e) Date: Nov. 12, 1997
[87] PCT Pub. No.: WO97/36101
    PCT Pub. Date: Oct. 2, 1997

[30] Foreign Application Priority Data

Mar. 26, 1996 [DE] Germany .......... 196 11 886.7

[51] Int. Cl.$^6$ .................................. F16K 31/06
[52] U.S. Cl. .......................... 251/64; 251/129.15
[58] Field of Search .................. 251/64, 129.15, 251/129.21; 335/257, 277, 247, 271

[56] References Cited

U.S. PATENT DOCUMENTS

| | | | |
|---|---|---|---|
| 4,563,133 | 1/1986 | Yasuhara | 251/129.15 X |
| 5,246,199 | 9/1993 | Numoto et al. | 251/129.15 |
| 5,503,366 | 4/1996 | Zabeck et al. | 251/129.15 X |
| 5,560,585 | 10/1996 | Krimmer et al. | 251/129.21 |

*Primary Examiner*—Kevin Lee
*Attorney, Agent, or Firm*—Edwin E. Greigg; Ronald E. Greigg

[57] ABSTRACT

A magnet valve having a valve seat body that has a valve opening with a valve seat. A spring-loaded valve member cooperates with the valve seat, in which the valve member forms the magnet armature of an electromagnet and is disposed between the valve seat body, acting as the check yoke of the electromagnet, and a hollow-cylindrical magnet core of the electromagnet. A valve member has a coaxial through opening, and having a damper element, disposed on the valve member, of elastic damping material that forms a sheathlike lining of the through opening that extends outward to cover one face end of the valve member and on the other face end of the valve member protrudes past this valve member, longitudinally continuous axial grooves open toward the through opening are made in the valve member and filled with damping material which protrudes past the second end face of the valve member, in order to assure long-term damping of switching noises.

20 Claims, 3 Drawing Sheets

MAGNET VALVE FOR FUEL TANK VENTILATION

PRIOR ART

The invention is based on a magnet valve, for tank ventilation in motor vehicles.

In a known magnet valve of this type, for the metered introduction of volatilized fuel into the intake conduit of an internal combustion engine of a motor vehicle (German Patent Disclosure DE 42 44 113 A1), the second damping portion of the damper element disposed on the valve member, which portion protrudes past the side of the valve member toward the magnet core, forms a narrow ring, which because of its relatively small cross section is vulnerable to wear, so that with increasing age the magnet valve tends to generate increased noise, since wear to the ring causes metal parts to strike one another when the valve opens. For the sake of improved long-term noise abatement, however, the wall thickness of the sheathlike lining of the through opening in the valve member, and hence the cross section of the protruding ring, cannot be increased arbitrarily, since this reduces the magnetic force of the electromagnet, which finally no longer suffices for fast valve opening.

ADVANTAGES OF THE INVENTION

The magnet valve according to the invention has the advantage over the prior art that by embodying the axial grooves in accordance with the invention, more damping material can be accommodated in the second damping portion, without significantly losing ferromagnetic armature material in the valve member, material that is required for adequate magnetic flux in the valve member for the sake of fast motion of the valve member. Between the axial grooves, distributed over the circumference of the through opening, adequate material cross sections remain, so that the magnetic resistance of the valve member is increased only insignificantly. Compared with the known magnet valve, the second damping portion is enlarged, with the same wall thickness of the damping material lining in the through opening, by the additional damping faces, which result on the face end of each axial groove as a result of the damping material that protrudes there. Moreover, the height of the ring of material of the through opening lining, which ring protrudes on the face end, can be reduced, which increases the magnetic force.

By means of the provisions recited herein, advantageous further features of and improvements to the magnet valve disclosed are possible.

In an advantageous embodiment of the invention, the extent to which the damping material in the individual axial grooves protrudes past the face end of the valve member toward the magnet core is dimensioned as 0.1 mm, while the extent of protrusion of the annular second damping portion on the same face end of the valve member is 0.2 mm. This annular damping portion is preferably embodied with an annular cross section that tapers in wedgelike fashion, with the tip of the wedge pointing away from the valve member. Preferably, a total of four axial grooves are provided, each offset from one another by 90° along the circumference of the through opening; the width of these grooves is much less than the spacing, in the circumferential direction, between the axial grooves. All of these provisions in terms of dimensions and shaping result in an optimization between long-term noise abatement on the one hand and on the other the maximum force to be brought to bear by the electromagnet in order to move the valve member quickly counter to the spring force acting upon the valve member.

BRIEF DESCRIPTION OF THE DRAWINGS

The invention is described in further detail in terms of an exemplary embodiment shown in the drawing. Shown are.

DESCRIPTION OF THE EXEMPLARY EMBODIMENT

Figure 1:
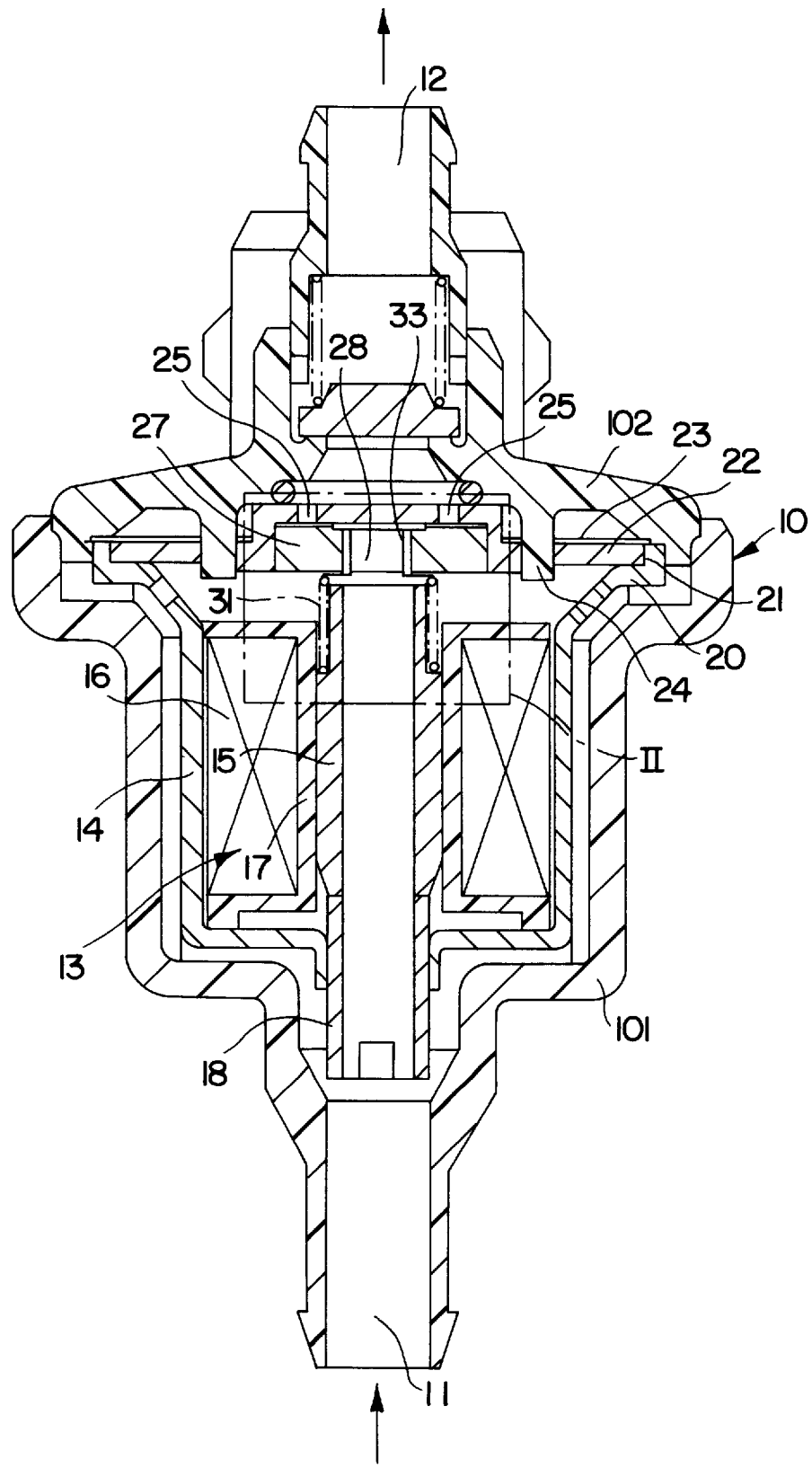
FIG. 1, a longitudinal section through a tank venting valve.

The tank venting valve shown in longitudinal section shown in FIG. 1, as an exemplary embodiment of an arbitrary magnet valve, is used for metered admixture of volatilized fuel from the fuel tank of a mixture-compressing internal combustion engine with externally supplied ignition, to a fuel-air mixture supplied to the engine via an intake conduit. One such tank venting valve is described in terms of its basic design and function in German Patent Disclosure DE 42 44 113 A1, for example. The tank venting valve has a two-part valve housing 10 with a cup-shaped housing part 101 and a cap-shaped housing part 102 closing off the part 101. The housing part 101 has an inlet neck 11 for connection to a venting neck of the fuel tank or to a reservoir downstream of fuel tank, filled with activated charcoal, for the volatilized fuel, while the housing part 102 has an outlet neck 12 for connection to the intake tube of the engine. The inlet neck 11 and outlet neck 12 are disposed, aligned with one another, axially in the respective housing parts 101, 102. An electromagnet 13 is disposed in the interior of the cup-shaped housing part 101.

The electromagnet 13 has a cup-shaped magnet housing 14, with a coaxial, hollow-cylindrical magnet core 15 penetrating the bottom of the cup and with a cylindrical exciter coil 16, which is seated on a coil carrier 17 that encloses the magnet core 15 in the magnet housing 14. On the bottom of the magnet housing 14, there is an outward-protruding threaded neck 18 with a female thread, which is screwed to a male-threaded portion of the hollow-cylindrical magnet core 15. By this means, the magnet core 15 can be axially displaced for adjustment purposes by rotating it in the magnet housing 14. The magnet core 15 is in alignment with the inlet neck 11, so that volatilized fuel flowing in here flows directly through the magnet core 15.

The edge of the magnet housing 14 is bent at an angle outward to form an annular bearing flange 20, which is bent over on its end to form an axially protruding annular rib 21. A valve seat body 22 that forms the return yoke of the electromagnet 13 is received in the bearing flange, covers the magnet housing 14, and rests peripherally on the annular rib 21. The valve seat body 22, by means of at least two fitting holes 23, is seated on retaining tabs 24 formed in the caplike housing part 102 and is firmly clamped with an accurate fit in the bearing flange 20 by the caplike housing part 102. Two valve openings 25 with a valve seat 26, which are closable by means of a valve member 27 disposed between the valve seat body 22 and the magnet core 15, are located in the valve seat body 22. Located centrally in the valve member 27, coaxially with the hollow-cylindrical magnet core 15, is an axial through opening 28 with a boundary wall 29, through which volatilized fuel arriving from the inlet neck 11 can reach the outlet neck 12 when the valve openings 25 are open. The valve member 27, made from magnetically conductive material, at the same time forms the armature of the electromagnet 13 and is secured to a leaf spring 30 that is fastened at its edges between the valve seat body 22 and the bearing flange 20. The valve member 27 is urged in the valve closing direction by a valve closing spring 31, which is braced on one end on the valve member 27 and on the other on an annular support shoulder 32 formed on the outer magnet core 15 (FIG. 2).

Figure 2:
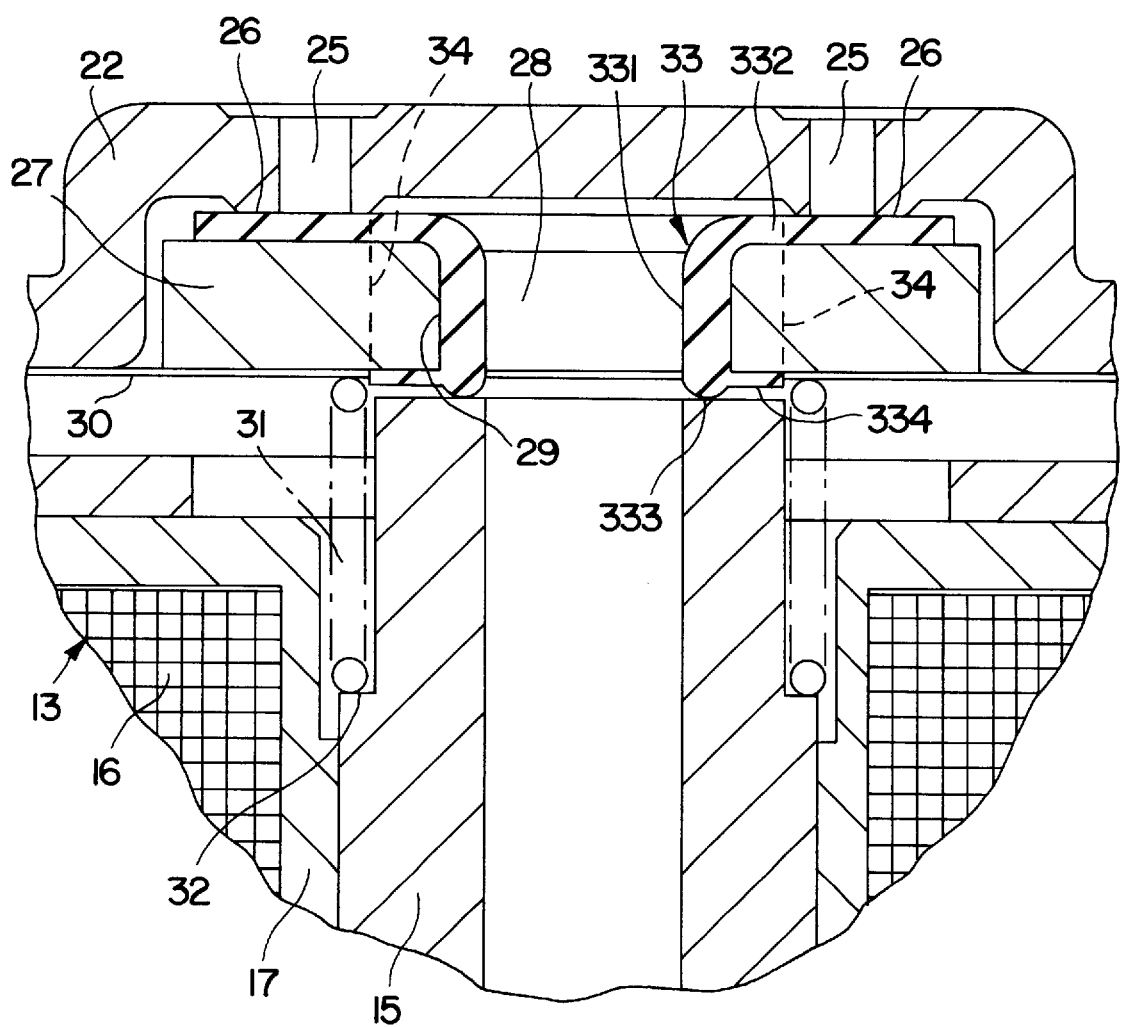
FIG. 2, an enlarged view of detail II of FIG. 1.
Figure 3:
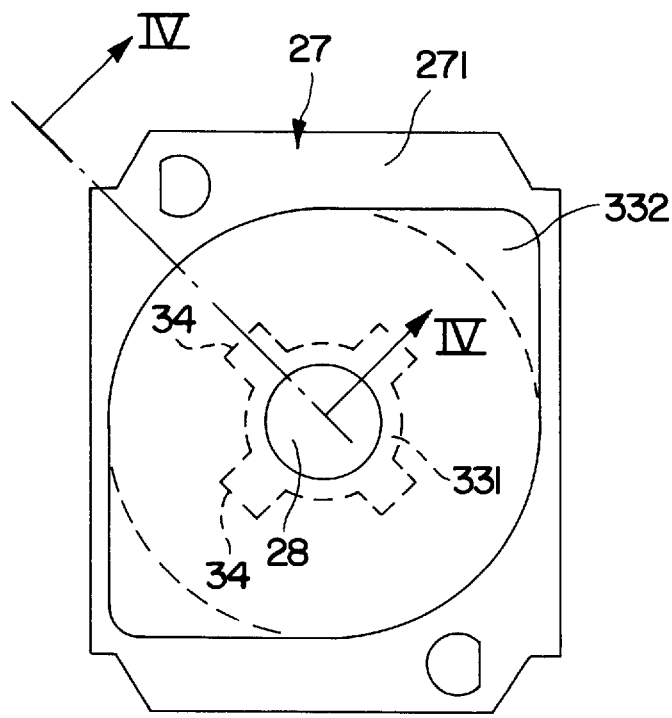
FIG. 3, a plan view of a valve member in the valve of FIG. 1 or 2.
Figure 4:
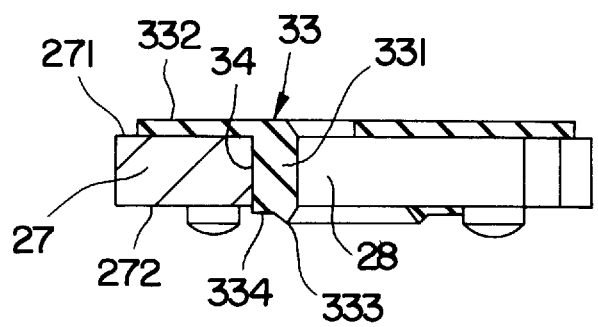
FIG. 4, a side view of the valve member of FIG. 3, partly in section along the line IV—IV of FIG. 3.

The valve member 27 is provided with a damper element 33 of elastic damping material, such as elastomer, which—as especially clearly seen in FIG. 2—with a tubular portion 331, lining the through opening 28 in the valve member 27, covers the boundary wall 29 of the through opening 28 and changes on one side into a first damping portion 332, extending flatly in a first end face 271 of the valve member 27 oriented toward the valve seat body 22, and on the other into a second damping portion 333 that protrudes past the second face end 272, toward the magnet core 15, of the valve member 27. The area of the first damping portion 332 is at least part enough that the first damping portion 332, which the valve is closed, covers the valve seats 26 of the two valve openings 25. The extent to which the second annular damping portion 333 protrudes past the second end face 272 of the valve member 27 is preferably selected to be 0.2 mm. The annular cross section is embodied as tapering in wedgelike fashion, with the rounded tip of the wedge pointing away from the valve member 27.

Four longitudinally continuous axial grooves 34, offset from one another by 90° of circumferential angle edge, are made in the boundary wall 29 of the through opening 28 and are open toward the through opening 28. These axial grooves 34 are completely filled with the elastic damping material of the damper element 33; the damping material protrudes past the second end face 272 of the valve member 27 with an extend of protrusion of 0.1 mm and thus forms four further individual damping faces 334 of the damper element 33. The width of the four axial grooves 34 is made much less, for instance less than half as large, as the spacing dimension in the circumferential direction of the axial grooves 34 from one another, so that enough ferromagnetic material for the magnetic flux is still present between the material-filled axial grooves 34.

The magnet valve described is closed when the electromagnet 13 is not excited, because the valve closing spring 31 presses the valve member 27 against the valve seats 26 at the valve openings 25. For opening the valve, the electromagnet 13 is excited, and the magnetic force pulls the valve member 27 away from the valve seat body 22 toward the magnet core 15. The damper element 33 prevents metal parts of the valve member 27 from striking the magnet core 15 or the valve seats 26 and thereby causing switching noises. The damper element 33 is vulcanized onto the ferromagnetic valve member 27, and the above-described individual portions 331–334 of the damper element 33 cohere with one another integrally.

The foregoing relates to preferred exemplary embodiments of the invention, it being understood that other variants and embodiments thereof are possible within the spirit and scope of the invention, the latter being defined by the appended claims.

We claim:

1. A magnet valve for tank ventilation in motor vehicles, comprising a valve seat body (22), which has at least one valve opening (25) with a valve seat (26), a spring-loaded valve member (27), that cooperates with the valve seat (26) for opening and closing the at least one valve opening (25), said valve member forms a magnet armature of an electromagnet (13), said valve member is disposed between the valve seat body (22) and a hollow-cylindrical magnet core (15) of the electromagnet (13) and has a through opening (28) that is coaxial with an axis of the magnet core, said valve member functions as a return yoke of the electromagnet (13), and a damper element (33) is disposed on the valve member (27), said damper element includes damping material that lines the through opening (28) like a sheath and changes over into a first damping portion (332), said first damping portion is disposed on a first face end (271) of the valve member (27) toward the valve seat body (22), said first damping portion is at least as large as the valve seat (26), and extends into an annular second damping portion (333) that protrudes past a second face end (272) of the valve member (27) toward the magnet core (15), a plurality of longitudinally continuous axial grooves (34) are made in the valve member (27) and open toward the through opening (28) and said axial grooves are distributed over a circumference of said through opening (28) and are made in the valve member (27) and filled with damping material, which protrudes past the second face end (272) of the valve member (27).

2. A magnet valve in accordance with claim 1, in which the extent of protrusion of the damping material from the axial grooves (34) is 0.1 mm.

3. A magnet valve in accordance with claim 2, in which the spacing of the axial grooves (34) from one another amounts to a multiple of their groove width.

4. A magnet valve in accordance with claim 3, in which the spacing of the axial grooves (34) from one another amounts to a multiple of their groove width.

5. A magnet valve in accordance with claim 4, in which a total of four axial grooves (34) are present and disposed offset from one another by 90° each at the circumference of the through opening (28).

6. A magnet valve in accordance with claim 5, in which a total of four axial grooves (34) are present, disposed offset from one another by 90° each at the circumference of the through opening (28).

7. A magnet valve in accordance with claim 1, in which the extent of protrusion of the annular second damping portion (333) is 0.2 mm.

8. A magnet valve in accordance with claim 2, in which the extent of protrusion of the annular second damping portion (333) is 0.2 mm.

9. A magnet valve in accordance with claim 3, in which the extent of protrusion of the annular second damping portion (333) is 0.2 mm.

10. A magnet valve in accordance with claim 5, in which the extent of protrusion of the annular second damping portion (333) is 0.2 mm.

11. A magnet valve in accordance with claim 10, in which the annular second damping portion (333) has an annular cross section tapering in wedgelike fashion, and a rounded tip of the wedge points away from the valve member (27).

12. A magnet valve in accordance with claim 11, in which the annular second damping portion (333) has an annular cross section tapering in wedgelike fashion, and a rounded tip of the wedge points away from the valve member (27).

13. A magnet valve in accordance with claim 12, in which the annular second damping portion (333) has an annular cross section tapering in wedgelike fashion, and a rounded tip of the wedge points away from the valve member (27).

14. A magnet valve in accordance with claim 13, in which the annular second damping portion (333) has an annular cross section tapering in wedgelike fashion, and a rounded tip of the wedge points away from the valve member (27).

15. A magnet valve in accordance with claim 14, in which the damping material that fills the axial grooves (34) is integral with the damping material that forms a lining (331) of the through opening (28) and the two damping portions (332, 333).

16. A magnet valve in accordance with claim 15, in which the damping material that fills the axial grooves (34) is integral with the damping material that forms a lining (331) of the through opening (28) and the two damping portions (332, 333).

17. A magnet valve in accordance with claim 16, in which the damping material that fills the axial grooves (34) is integral with the damping material that forms a lining (331) of the through opening (28) and the two damping portions (332, 333).

18. A magnet valve in accordance with claim 17, in which the damping material that fills the axial grooves (34) is integral with the damping material that forms a lining (331) of the through opening (28) and the two damping portions (332, 333).

19. A magnet valve in accordance with claim 7, in which the damping material is an elastomer and is vulcanized onto the valve member (27), which comprises a ferromagnetic material.

20. A magnet valve in accordance with claim 15, in which the damping material is an elastomer and is vulcanized onto the valve member (27), which comprises ferromagnetic material.

* * * * *